(12) United States Patent
Bengtsson et al.

(10) Patent No.: US 7,966,084 B2
(45) Date of Patent: Jun. 21, 2011

(54) COMMUNICATION TERMINALS WITH A TAP DETERMINATION CIRCUIT (75) Inventors: Truls Bengtsson, Lund (SE); Bjorn Hansson, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1871 days.

(21) Appl. No.: 11/073,554

(22) Filed: Mar. 7, 2005

(65) Prior Publication Data

US 2006/0211499 A1 Sep. 21, 2006

(51) Int. Cl.
G06F 17/00 (2006.01)
H04R 3/00 (2006.01)
G08B 21/00 (2006.01)

(52) U.S. Cl. ............. 700/94; 381/92; 340/540; 340/665

(58) Field of Classification Search ............ 381/92, 381/111, 365; 700/94, 264, 301; 84/611, 84/612, 635, 636, 651, 652, 667, 668, 713, 84/714; 340/502, 517, 518, 524, 540, 657, 340/659, 661, 662, 665

See application file for complete search history.

(56) References Cited

U.S. PATENT DOCUMENTS

| 4,845,464 | A | * | 7/1989 | Drori et al. ..................... 340/429 |
| 4,968,877 | A | * | 11/1990 | McAvinney et al. ......... 250/221 |
| 6,130,936 | A | * | 10/2000 | Hartmann ................. 379/142.01 |
| 6,369,794 | B1 | | 4/2002 | Sakurai et al. |
| 6,466,198 | B1 | * | 10/2002 | Feinstein ..................... 345/158 |
| 2003/0132950 | A1 | * | 7/2003 | Surucu et al. ................ 345/700 |

| 2004/0004600 | A1 | 1/2004 | Yoneno et al. |
| 2004/0017919 | A1 | 1/2004 | Miyakura |
| 2004/0233158 | A1 | 11/2004 | Stavely et al. |

FOREIGN PATENT DOCUMENTS

| EP | 1 583 335 A1 | 10/2005 |
| JP | 10-229570 A | 8/1998 |
| JP | 2000-148351 A | 5/2000 |
| JP | 2002-271857 A | 9/2002 |
| JP | 2004-129192 A | 4/2004 |
| JP | 2004-155385 A | 6/2004 |
| JP | 2004-283959 A | 10/2004 |

(Continued)

OTHER PUBLICATIONS

Office Action, Japanese Patent Application No. 2008-500104, Jul. 3, 2009.

(Continued)

*Primary Examiner* — Curtis Kuntz
*Assistant Examiner* — Jesse A Elbin
(74) *Attorney, Agent, or Firm* — Myers Bigel Sibley & Sajovec, P.A.

(57) ABSTRACT

A communication terminal includes a housing a sound sensing device, a tap determination circuit, and a controller. The housing at least partially encloses the sound sensing device, the tap determination circuit and the controller. The sound sensing device is configured to generate an electrical sense signal from an incident audible signal. The tap determination circuit is configured to determine the presence of a component of the sense signal that is associated with a physical tap on the housing and to generate an indication of an operator input based on the determined presence of the component of the sense signal that is associated with a physical tap. The controller is configured to utilize the indication of an operator input to perform one or more communication terminal functions.

21 Claims, 2 Drawing Sheets

FOREIGN PATENT DOCUMENTS

| | | |
|---|---|---|
| JP | 2004-348725 A | 12/2004 |
| WO | WO 01/42871 A1 | 6/2001 |
| WO | WO 01/78055 A1 | 10/2001 |
| WO | WO 02/088853 | 11/2002 |
| WO | WO 2005/081507 A1 | 9/2005 |
| WO | WO 2006/036262 A2 | 4/2006 |

OTHER PUBLICATIONS

International Search Report for PCT/EP2006/002025; Date of mailing Jun. 23, 2006.

* cited by examiner

COMMUNICATION TERMINALS WITH A TAP DETERMINATION CIRCUIT

FIELD OF THE INVENTION

The present invention generally relates to the field of communications, and more particularly to an operator interface to functionality in a communication terminal.

BACKGROUND OF THE INVENTION

The consumer market for wireless communication terminals continues to demand increased functionality in a smaller and aesthetically pleasing housing, and with an intuitive and easy to use operator interface. Communication terminals that provide voice and data communications along with games have become commonplace. Voice communication is usually facilitated by providing a large speaker near a top of the terminal that can be placed near an operator's ear, and a microphone near a bottom of the terminal to sense the operator's voice. A rectangular screen is usually provided below the speaker, and a keypad is provided between the screen and the microphone.

Keypads on communication terminals are generally configured to be operated with a single hand, otherwise if two hands are used the screen may not be viewable. Such keypads may not provide an intuitive or easy to use interface when used as an interface for playing games. Instead, gaming interfaces are generally configured with depressable buttons that are separated by a sufficient distance to facilitate two-handed use. Providing an intuitive and easy to use gaming interface on a communication terminal can be complicated by the need to also support and facilitate voice and data communication with a large speaker, keypad, microphone and screen all within the same housing.

SUMMARY OF THE INVENTION

In some embodiments of the present invention, a communication terminal includes a housing, a sound sensing device, a tap determination circuit, and a controller. The housing at least partially encloses the sound sensing device, the tap determination circuit and the controller. The sound sensing device is configured to generate an electrical sense signal from an incident audible signal. The tap determination circuit is configured to determine the presence of a component of the sense signal that is associated with a physical tap on the housing and to generate an indication of an operator input based thereon. The controller is configured to utilize the indication of an operator input to perform one or more communication terminal functions.

In some further embodiments, the communication terminal functions include a wireless communication function and a game function. The wireless communication function decodes data that is received over a wireless communication interface. The game function generates data that is used to graphically display a game to an operator. The game function also utilizes the indication of an operator input as feedback from an operator for use in the game.

In some further embodiments, the sound sensing device can include a speaker that generates sound responsive to an input signal, and that generates the sense signal as a component of an output signal from the speaker responsive to an incident audible signal. The tap determination circuit can identify a contribution of the sense signal to the output signal from the speaker. The input signal to the speaker can be generated from data that received over a wireless communication interface and decoded by the wireless communication function.

In some further embodiments, the tap determination circuit can be configured to subtract the input signal from the output signal to the speaker to separate the electrical sense signal therefrom. The tap determination circuit can be configured to identify when the output signal from the speaker comprises a broad frequency spectrum burst therein that has been caused by an audible signal that is associated with a physical tap on the housing, and it can be configured to generate the indication of an operator input based on the identification of the broad frequency spectrum burst.

In some further embodiments, the sound sensing device can further include a microphone that is configured to generate a microphone signal responsive to an incident audible signal. The tap determination circuit can be configured to identify a physical tap on the housing based on both the output signal from the speaker and the microphone signal from the microphone. The tap determination circuit can be further configured to identify an approximate direction of arrival of an audible signal based on the microphone signal and the output signal from the speaker. More particularly, the tap determination circuit can differentiate between an audible signal generated by a physical tap on one end portion of the housing from a physical tap on an opposite end portion of the housing. The tap determination circuit can generate a first indication of user input responsive to a first direction of arrival of the audible signal from a tap on a first portion of the housing, and can generate a second indication of a different user input responsive to a second direction of arrival of an audible signal from a tap on a second portion of the housing.

In some further embodiments, the sound sensing device can include a plurality of microphones that are each configured to generate a microphone signal responsive to an incident audible signal. A first one of the microphones can be adjacent to a first portion of the housing to have increased sensitivity to a physical tap on the first portion. A second one of the microphones can be adjacent to a second portion of the housing to have increased sensitivity to a physical tap on the second portion.

In some further embodiments, the tap determination circuit can be further configured to identify an approximate direction of arrival of an audible signal based on the microphone signals. More particularly, the tap determination circuit can differentiate between an audible signal generated by a physical tap on one end portion of the housing from a physical tap on an opposite end portion of the housing based on the microphone signals. The tap determination circuit may identify an approximate direction of arrival of an audible signal associated with a physical tap on the housing based on a phase difference between appearance of a contribution of the audible signal to the microphone signals.

In some further embodiments, the tap determination circuit may be further configured to generate a first indication of user input responsive to a first direction of arrival of an audible signal from a tap on a first portion of the housing and to generate a second indication of a different user input responsive to a second direction of arrival of an audible signal from a tap on a second portion of the housing.

In some further embodiments, the housing can include a first sound cavity portion that is configured to generate sound having a first primary sound when physically tapped. The tap determination circuit can be further configured to identify a component of the sense signal that is attributed to sound from the first sound cavity having the first primary sound, and to generate an indication of a first type of operator input based
} on the identified component of the sense signal. The first sound cavity can include a raised button that extends beyond an outer surface of the housing. The raised button can include a flexible material that can be compressed by a physical tap thereon. The sound cavity may alternatively, or additionally, be formed by varying the relative stiffness of various portions of the housing (e.g., facilitating the generation of sound and/or generating different sounds when tapped). The relative stiffness of the housing may be varied by, for example, adding different materials to, or varying the material composition of, the particular portions of the housing. The housing may also include a collapsing cavity (e.g., bubble "membrane" button) and/or a mechanical device (e.g., retractable pen type mechanism) that can be actuated by an operator to generate an audible sound when tapped.

In some further embodiments, the sound sensing device can include at least one microphone, and a first sound cavity portion that is configured to focus sound generated from a physical tap thereon toward the microphone.

In some further embodiments, the housing can include a second sound cavity portion that is configured to generate sound having a second primary sound when physically tapped. The tap determination circuit can be further configured to identify a component of the sense signal that is attributed to sound from the second sound cavity having the second primary sound, and to generate an indication of a second type of different operator input based on identified component.

In some further embodiments, the sound sensing device can include a first microphone and a second microphone. The first microphone can be adjacent to a first portion of the housing. The second microphone can be adjacent to a second portion of the housing. The tap determination circuit can be configured to identify and distinguish a physical tap on the first portion of the housing from a physical tap on the second portion of the housing based on the microphone signals from the corresponding microphones, and to generate an indication of a first type of operator input based on identifying a physical tap on the first portion of the housing, and to generate an indication of a second type of different operator input based on identifying a physical tap on the second portion of the housing. The first and second microphones can be adjacent to opposite end portions of a same side of the housing.

DETAILED DESCRIPTION OF EMBODIMENTS

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawing, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or".

As used herein, a "communication terminal" includes, but is not limited to, a terminal that is configured to receive and/or transmit communication signals via a wireline connection, such as via a public-switched telephone network (PSTN) or another data connection/network, and/or via a wireless air interface with, for example, a cellular network, a wireless local area network (WLAN), and/or another communication terminal (e.g., via a Bluetooth interface). Examples of communication terminals include, but are not limited to: cellular phones; satellite phones; Personal Digital Assistants (PDA) that can include a radio frequency transceiver and a pager, Internet/intranet access, Web browser, organizer, calendar; and/or laptop or palmtop computers configured to receive and/or transmit communication signals.

Figure 1:
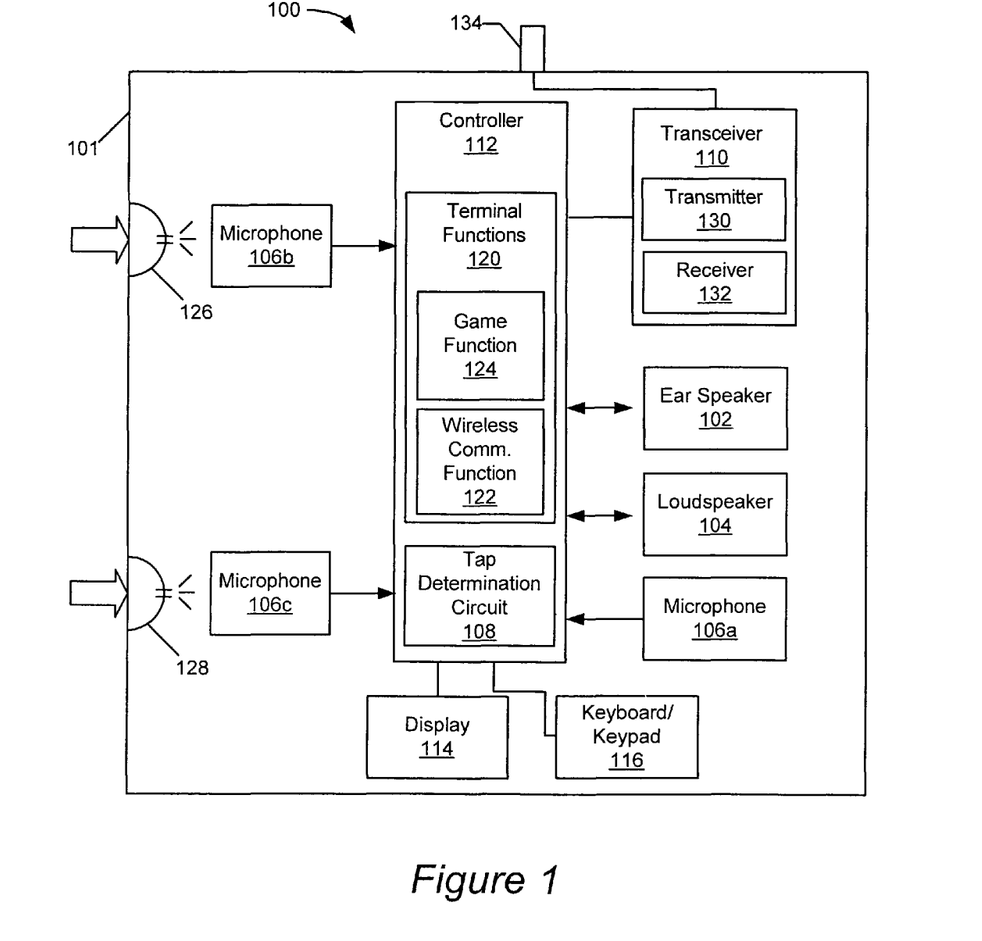
FIG. 1 is a block diagram that illustrates a communication terminal in accordance with various embodiments of the present invention.

Referring now to FIG. 1, an exemplary communication terminal 100, in accordance with some embodiments of the present invention, includes a housing 101 that encloses an ear speaker 102, a loudspeaker 104, three microphones 106a, 106b, 106c, and a transceiver 110 that communicate with a controller 112. The communication terminal 100 may also include a display 114 and a keyboard/keypad 116.

The transceiver 110 typically includes both a transmitter 130 and a receiver 132 to allow two way communications, but the present invention is not limited to such devices and, as used herein, a "transceiver" may include only the transmitter 130 or the receiver 132. The communication terminal 100 may thereby communicate with a base station and/or another terminal using radio frequency signals, which may be communicated through an antenna 134. For example, the communication terminal 100 may be configured to communicate via the transceiver 110 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS).

The ear speaker 102 ("ear piece") may be directed toward a same side of the communication terminal 100 as the microphone 106a and configured to be placed closely adjacent to a user's ear. In contrast, the loudspeaker 104 may be directed toward an opposite side of the communication terminal 100 relative to the microphone 106a, and may be configured to generate higher volume sound than the ear speaker 102. Accordingly, the loudspeaker 104 may be configured for use in generating a ring sound to indicate an incoming call to the communication terminal 100, and/or for use in generating a handsfree received sound so that the communication terminal 100 can be used as a speakerphone in a "handsfree" mode.

The controller 112 is configured to supply a speaker input signal to the ear speaker 102 and/or to the loudspeaker 104 to cause sound to be generated therefrom. The controller 112 can selectively supply the speaker signal to one or both of the ear speaker 102 and the loudspeaker 104 based on a speakerphone activation indication from a user, which may be input through the keyboard/keypad 116. The controller 112 can sense an incoming telephone call to the communication terminal 100 and generate a call indication based thereon, and can supply a ring signal as the speaker signal to the loudspeaker 104 to generate a ring sound therefrom based on the call indication.

Some embodiments of the present invention arise from a recognition that a physical tap by an operator on the housing 101 can generate a unique audible sound that can be sensed by the microphones 106a-c, the ear speaker 102, and/or the loudspeaker 104. The controller 112 can detect the sensed tap sound and use it as an operator input to one or more functions within the communication terminal 100, including, for example, as operator input to a game. Moreover, the communication terminal 100 can be configured to distinguish a physical tap that occurs on one end of the housing 101 from a physical tap on an opposite end of the housing 101. Additionally, the communication terminal 100 may determine when a sound source is moving, such as when a finger is rubbed along the housing.

Accordingly, an operator may hold the housing with two hands, and can tap on portions of the housing 101 that are separated by some distance, and tap sounds can be distinguished from one another and used as different operator inputs to function(s) in the communication terminal 100. The communication terminal 100 may thereby provide "virtual buttons" by which an operator may provide input to, for example, a game by tapping on various portions of the housing 101. An operator may also rub a portion of the housing 101, such along a ribbed/textured edge or other portion of the terminal 100, to provide a more continuous and moving sound source. The terminal 100 may be configured to sense and use such continuous and/or moving sound source(s) to provide a virtual operator interface of, for example, a virtual scrollbar and/or volume control.

As used herein, the term "audible" refers to a signal that can be sensed by a microphone and/or speaker and generate an electrical signal responsive thereto, such as by, for example, vibrating an element in the microphone and/or speaker. The term "audible" includes, but is not limited to, sound that can be heard by an operator. The term "tapping" includes, but is not limited to, an operator striking, rubbing, scraping, or making any other physical contact with the housing 101 using, for example, any object and/or a finger or another portion of operator's body to cause an audible signal therefrom.

In some embodiments, the microphones 106a-c are each configured to generate an electrical sense signal responsive to an incident audible signal. In some further embodiments, the loudspeaker 104 and/or the ear speaker 102 are configured to generate an electrical sense signal responsive to an incident audible signal. For example, the loudspeaker 104 and/or the ear speaker 102 may each be a conventional speaker that includes a diaphragm, voice coil, and magnet. Incident audible signals can cause the diaphragm and connected voice coil to move relative to the magnet, and thereby induce a current signal in the voice coil. The induced current can thereby serve as an electrical sensing signal, and which can be passed through an analog-to-digital (A/D) converter to provide a digital sensing signal.

The communication terminal 100 further includes a tap determination circuit 108, which may be separate from or at least partially within the controller 112. For purposes of illustration only, the tap determination circuit 108 has been illustrated within the controller 112, where its functionality may be carried out by software in accordance with at least one embodiment herein.

The tap determination circuit 108 is configured to determine the presence of a component of the sense signal from the microphones 106a-c, the loudspeaker 104, and/or the ear speaker 102 that is associated with a physical tap on the housing 101. The tap determination circuit 108 also generates an indication of an operator input based on the determined presence of the tap associated component of the sense signal. The tap determination circuit 108 may be based on a convention sound/voice recognition circuit/software in a cellular phone or other electronic device which is used to detect one or more sound patterns. Accordingly, such sound/voice recognition circuitry/software may be used to provide voice-dialing capability in the terminal 100 and to sense tapping.

The controller 112 is configured to utilize the indication of an operator input from the tap determination circuit 108 as input (e.g., operator feedback) to one or more functions. For example, the controller 112 can provide various functionality for an operator through functions 120 that can include one or more wireless communication functions 122 and one or more game functions 124. The wireless communication function 122 can be configured to decode data that is received through receiver 132 over a wireless communication interface. The game function 124 can be configured to provide functionality that can include graphics that are displayed on the display 114. Although the functions 120 are illustrated within the controller 112, it is to be understood that they may be carried out by software that is executed by the controller 112 from an internal and/or external memory.

The controller 112 can use the indication of operator input as feedback that is used by one or more of the functions 120. An operator may thereby tap on the housing 101 to provide input to, for example, the game function 124. Accordingly, the gaming interface that is provided by the communication terminal 100 can include enabling an operator to tap on the housing 101 and/or rub a portion thereof to provide feedback that is used by the game function 124. The game function 124 may thereby use the indication of a tap on the housing 101 in a same way as if an operator had pressed a conventional button, slid a scroll-bar, and/or turned a rotatable wheel on the terminal 100.

Although some embodiments have been described in which the controller 112 provides a game interface via the tap sensors, it is to be understood that embodiments of the present invention are not limited to providing a game interface and that instead any operator interface may be provided. For example, the controller 112 can use tap-based input as a volume control, scroll bar, to open/close an application, to initiate and/or answer a phone call, or as any other indication of input from an operator to one or more functions in the terminal 100.

The controller 112 may provide a visual, audio, or vibrational indication to an operator of when tap-based input can be input to the terminal 100 and/or when tap based input has been sensed by the terminal 100. For example, the controller 112 may provide such indication through, for example, the display 114, one or more LEDs, the ear speaker 102, the loudspeaker 104, and/or a vibration device.

As will be further explained below, the microphones 106a-c, ear speaker 102, and/or the loudspeaker 104 can be arranged to provide increased sensitivity for sensing tapping at certain locations on the housing 101, and/or to identify an approximate location of where tapping occurred. Accordingly, a plurality of different "virtual buttons" may thereby be provided to allow an operator to tap on different areas of the housing 101 to signal different types of input. Such virtual buttons may thereby provide a similar type of input to one or more of the functions 120 as that which may otherwise be provided by conventional electrical switch-type buttons. However, in contrast to convention switch-type buttons that use an electrical switch that is actuated by pressing of the button, virtual buttons are activated by tapping on the housing 101 to generate an audible signal.

The microphones 106b and 106c can be located adjacent to different spaced apart portions of the housing 101 to provide increased sensitivity to a physical tap on the adjacent portion of the housing 101. The housing 101 can include first and second sound cavities 126, 128 that are configured to generate sound having a primary sound when tapped. The arrows illustrate a direction that an operator's finger may tap the housing 101 to generate an audible signal. The location and/or shape of the sound cavities 126, 128 can each be configured to focus the sound generated therein to a respective one of microphones 106b and 106c. The tap determination circuit 108 may thereby sense a physical tap on a portion of the housing associated with the sound cavities 126, 128 based on the sense signal from the microphones 106b, 106c containing a component that is associated with a threshold amount of sound having the primary sound.

The sound cavities 126, 128 themselves and/or a portion of the housing that is adjacent thereto may be marked with an indicia that can indicate to an operator where the housing 101 may be tapped to use the capability of the sound cavities 126, 128. Accordingly, when the sound cavities 126,128 are not readily visible to an operator (i.e., within the housing 101), their location may be indicated via such indicia.

Moreover, sound cavities or other sound generating mechanism may be provided by, for example, a removable cover that may be placed on the housing 101. For example, a sound cavity or other sound generating mechanism may be adhesively or otherwise connected to the housing 101, or a cover that includes a sound cavity or other sound generating mechanism may be used to enclose at least a portion of the housing 101. Accordingly, an application (e.g., game) may be sold with a sound cavity or other sound generating mechanism that can be connected to the housing a terminal and serve as a virtual button or other input device for the application.

The tap determination circuit 108 can generate an indication of a first type of operator input when the tap component is identified in the sense signal from one of the microphones 106b, 106c, and can generate a second type of operator input when the tap component is identified in the sense signal from the other one of the microphones 106b, 106c. Accordingly, a first virtual button can be formed by the sound cavity 126 and microphone 106b, and a second virtual button can be formed by the sound cavity 128 and the microphone 106c.

Figure 2:
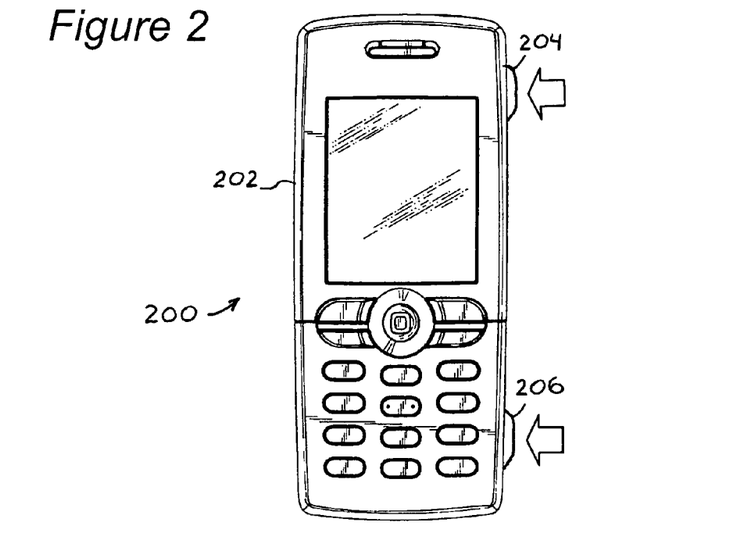
FIG. 2 illustrates a communication terminal that includes two sound cavities that may be used with the circuitry shown in FIG. 1 in accordance with some embodiments of the present invention.

Although the sound cavities 126 and 128 have been illustrated in FIG. 1 as extending away from an interior surface of the housing 101, they may alternatively or additionally extend away from an exterior surface of the housing 101. For example, FIG. 2 is a front view of a communication terminal 200 with a housing 202 that includes a pair of button shaped sound cavities 204, 206 that extend away from a side of the housing 202. Once again the arrows illustrate a direction that an operator's finger may tap the housing 202 to generate an audible signal. The sound cavities 204, 206 may include a flexible material that can be momentarily compressed by a physical tap thereon to generate an audible tap signal.

When the terminal 100 has a partitioned housing 101 (e.g., clam shell, jack-knife type housing, or other partition), the controller 112 may be configured to sense taps on the different partitions of the housing 101. For example, a microphone may be disposed in each partition of the housing 101 so that taps on the different partitions of the housing 101 can be distinguished from one another and used an indications of different operator input.

The tap determination circuit 108 can be configured to identify an approximate location on the housing 101 that was physically tapped to generate an audible signal. The tap determination circuit 108 may then generate indications of different operator inputs based on the determined locations of the tapping.

In some embodiments, the sound cavity 126 can be configured to generate sound having a first primary sound when tapped, and the other sound cavity 128 can be configured to generate sound having a second primary sound when tapped, where the first and second primary resonance frequencies are different. The tap determination circuit 108 can then determine that a portion of the housing 101 that is adjacent to the sound cavity 126 was tapped when the sensed signal from the microphones 106b and 106c, the microphone 106a, the ear speaker 102, and/or the loudspeaker 104 contains a threshold component that is associated with the first primary sound. Similarly, the tap determination circuit 108 can determine that a portion of the housing 101 that is adjacent to the sound cavity 128 was tapped when the sensed signal contains a threshold component that is associated with the second primary sound.

The microphones 106b and 106c may be eliminated from the communication terminal 100, and the tap determination circuit 108 can rely on the sense signal(s) from the microphone 106a, the ear speaker 102, and/or the loudspeaker 104. For example, the sound cavities 126 and 128 may focus the generated sound to the ear speaker 102, the loudspeaker 104, and the microphone 106a. The tap determination circuit 108 can be configured to identify a tap on the housing 101 that occurs at a location other than at the sound cavities 126, 128.

The tap determination circuit 108 can be configured to identify an approximate location on the housing 101 that was physically tapped. The tap determination circuit 108 may then generate indications of different operator inputs based on the determined locations of the tapping.

In some embodiments, the tap determination circuit 108 is configured to determine an approximate direction of arrival of an audible tap signal to the microphones 106a, 106b, 106c, the ear speaker 102, and/or the loudspeaker 104, and a corresponding portion of the housing 101 that was tapped. The approximate direction of arrival may be determined by identifying a phase difference between appearance of a component in the sense signal that is associated with a physical tap on a portion of the housing (e.g., an indication of time of arrival thereto).

For example, if a portion of the housing that is closer to the ear speaker 102 than to the microphone 106a is tapped, then the audible signal will arrive at the speaker 102 before the microphone 106a, and the sense signal from the ear speaker 102 will have a tap component therein that leads a phase of a corresponding tap component in the sense signal from the microphone 106. The tap determination circuit 108 can thereby determine that a portion of the housing 101 that is closer to the ear speaker 102 than to the microphone 106a was tapped, and it can generate a corresponding indication of an operator's input. Accordingly, a first virtual button can be defined along a top portion of the housing 101 and a second virtual button can be defined along a lower portion of the housing 101. The tap determination circuit 108 can thereby generate different indications to the functions 120 based on which of the virtual buttons is tapped.

The tap determination circuit 108 may define more virtual buttons by distinguishing taps that occur on various other portions of the housing from one another, and can generate corresponding different indications of an operator's input based on which of the virtual buttons is tapped. The tap determination circuit 108 may rely on various combinations of the microphones 106a, 106b, 106c, the ear speaker 102, and/or the loudspeaker 104 to provide increased accuracy in the determination of an approximate location at which a tap occurred on the housing 101. Increased accuracy in the determination of the tapped portion of the housing 101 can allow definition of more virtual buttons on the housing 101.

As explained above, the ear speaker 102 and/or the loudspeaker 104 may be used both to generate sound for a user based on an input signal from the controller 112, and to sense a physical tap on the housing 101 and generate a corresponding component in the output signal therefrom to the controller 112. When the ear speaker 102 and/or the loudspeaker 104 is not being operated to generate sound, the sense signal may be effectively zero until an incident audio signal causes the associated ear speaker 102 and/or the loudspeaker 104 to output a signal therefrom, such as in the form of a voltage across its terminals and/or a current therethrough.

When the ear speaker 102 and/or the loudspeaker 104 are being operated to generate sound, the output signal can include the sense signal as a component therein that is caused by an incident audible signal which may arise from a tap on the housing 101. The tap determination circuit may identify a possible tap related component of the sense signal by subtracting the input signal to the ear speaker 102 and/or the loudspeaker 104 from the output signal there from. The input signal may also be compensated for the frequency response of the ear speaker 102 and/or the loudspeaker 104 themselves.

The tap determination circuit 108 may identify when the sense signal includes a component that is caused by a tap on the housing 101 in the frequency domain and/or the time domain. In the frequency domain, a tap will generate a broad frequency spectrum burst that will soon attenuate in a way that is highly dependent on the characteristics of the housing 101. By altering the actual intended tapping area (virtual button) it is possible to alter both the initial frequency spectrum) and the attenuation. In the time domain, the tap would appear as a spike with a reverse slope that quickly attenuates to silence. However, there can be resonance spikes after the impact and compression/de-compression sounds of the tap itself (e.g., "kla-klunk"). Such compression/de-compression sounds can be used to further identify the tap in the time domain, and may be enhanced by various of the means described herein (e.g., varying stiffness of the housing, composition/shape of the housing, and mechanical device that can be actuated by an operator to generate an audible sound). The tap determination circuit 108 may generate indications of different types of operator input (e.g., representing different virtual keys and/or different activation of certain virtual keys) based on sensing tapping that occurs within one or more ranges of occurrence rates (e.g., slow tapping versus fast tapping).

The terminal 100 may also include circuitry/software that is configured to reduce/cancel room echo and to reduce/cancel feedback that may occur between the loudspeaker 104 and one or more of the microphones 106a-c. Such circuitry/software may also be used when the terminal 100 is configured to provide speaker-phone functionality, and may thereby serve a dual-purpose during a speaker-phone mode and during a tap-based operator input mode.

Figure 3:
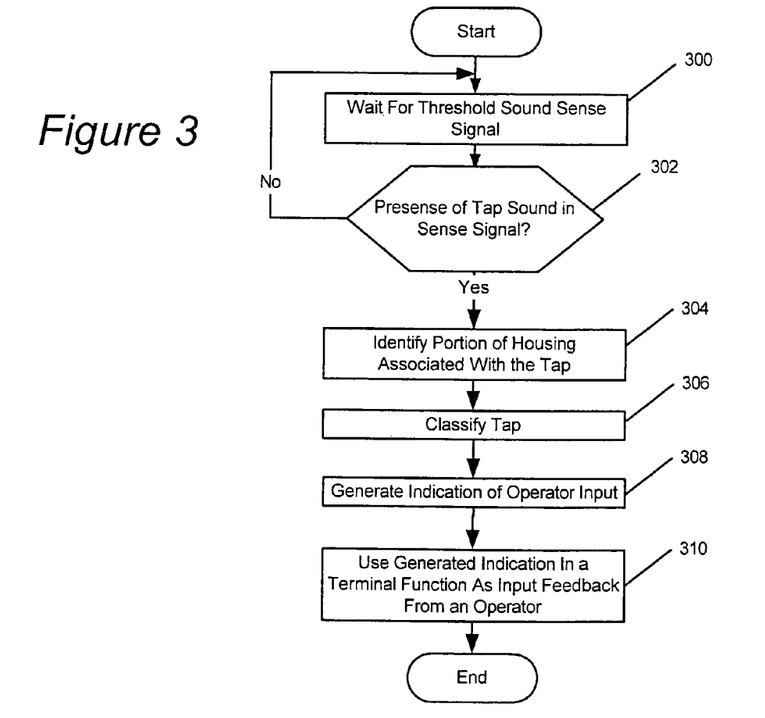
FIG. 3 is a flowchart that illustrates operations for detecting a tap on a housing of a communication device, and for generating and using an indication of the operator input in accordance with some embodiments of the present invention.

FIG. 3 illustrates a flowchart of operations that may be carried out by, for example the tap determination circuit 108 shown in FIG. 1, to detect a physical tap on the housing 101 and to generate and use an indication of an operator input, in accordance with some embodiments of the present invention. At Block 300, operation awaits one or more sense signals that contain at least a threshold level of a component that may be associated with a physical tap on the housing 101. A determination is made at Block 302 as to whether the sense signal(s) include a component that is caused by a tap on the housing 101. A portion of the housing 101 that is associated with the tap is identified at Block 304. Identification of the tapped portion of the housing 101 can include, as was explained above, determining a direction from which the tap sound arrived at sound sensing devices, and/or the identification can be based on a comparison of the relative levels of the tap components in the sense signals from a plurality of sound sensing devices. The identified tap is classified at Block 306 based on where on the housing 101 the tap originated and/or based on characteristics of the tap (e.g., tapping rate). An indication of the operator input is generated at Block 308 based on the classification attributed to the tap. Accordingly, different types of operator inputs can be generated based on where on the housing the tap occurred and/or based on other characteristics of the tap. At Block 310, one or more functions in the communication terminal 100 (e.g., a game program hosted in the terminal 100) use the generated indication as feedback from an operator.

Many variations and modifications can be made to the preferred embodiments without substantially departing from the principles of the present invention. All such variations and modifications are intended to be included herein within the scope of the present invention, as set forth in the following claims.

That which is claimed is:

1. A communication terminal comprising:
   a housing comprising a first sound cavity portion that is configured to generate sound having a first primary sound when physically tapped;
   a sound sensing device that is configured to generate an electrical sense signal from an incident audible signal;
   a tap determination circuit that is configured to determine presence of a component of the sense signal that is associated with a physical tap on the housing and to generate an indication of an operator input based on the determined presence of the component of the sense signal that is associated with a physical tap, and is further configured to identify a component of the sense signal that is attributed to sound from the first sound cavity having the first primary sound, and to generate an indication of a first type of operator input based on the identified component of the sense signal; and a controller that is configured to utilize the indication of the first type of operator input to perform one or more communication terminal functions, wherein the sound sensing device, the tap determination circuit and the controller are at least partially enclosed by the housing.

2. The communication terminal of claim 1, wherein:

the communication terminal functions comprise a wireless communication function that decodes data received over a wireless communication interface, and a game function that generates data for use in graphically displaying a game to an operator; and the game function utilizes the indication of an operator input as feedback from an operator for use in the game.

3. The communication terminal of claim 1, wherein:

the sound sensing device comprises a speaker that is configured to generate sound responsive to an input signal, and to generate the sense signal as a component of an output signal from the speaker responsive to an incident audible signal; and the tap determination circuit is configured to identify a contribution of the sense signal to the output signal from the speaker.

4. The communication terminal of claim 3, wherein:

the communication terminal functions comprise a wireless communication function to decode data received over a wireless communication interface into the input signal to the speaker to generate sound from the speaker, and a game function that generates data for use in graphically displaying a game to an operator; and the game function utilizes the indication of an operator input as feedback from an operator for use in the game.

5. The communication terminal of claim 3, wherein the tap determination circuit is configured to identify when the output signal from the speaker comprises a broad frequency spectrum burst therein that has been added to the output signal by an audible signal that is associated with a physical tap on the housing, and is configured to generate the indication of an operator input based on the identification of the broad frequency spectrum burst in the output signal from the speaker.

6. The communication terminal of claim 3, wherein:

the sound sensing device further comprises a microphone that is configured to generate a microphone signal responsive to an incident audible signal; and the tap determination circuit is configured to identify a physical tap on the housing based on both the output signal from the speaker and the microphone signal from the microphone.

7. The communication terminal of claim 6, wherein the tap determination circuit is configured to identify an approximate direction of arrival of an audible signal associated with a physical tap on the housing based on the microphone signal and the output signal from the speaker.

8. The communication terminal of claim 7, wherein the tap determination circuit is configured to differentiate between an audible signal generated by a physical tap on one end portion of the housing from a physical tap on an opposite end portion of the housing.

9. The communication terminal of claim 7, wherein the tap determination circuit is configured to generate a first indication of user input responsive to a first direction of arrival of an audible signal associated with a physical tap on a first portion of the housing and to generate a second indication of a different user input responsive to a second direction of arrival of an audible signal associated with a physical tap on a second portion of the housing.

10. The communication terminal of claim 1, wherein the tap determination circuit is configured to subtract the input signal to a speaker from the output signal from the speaker to separate the electrical sense signal therefrom.

11. The communication terminal of claim 1, wherein:

the sound sensing device comprises a plurality of microphones that are each configured to generate a microphone signal responsive to an incident audible signal; and the tap determination circuit is configured to identify an approximate direction of arrival of an audible signal associated with a physical tap on the housing based on the microphone signal from the microphones.

12. The communication terminal of claim 11, wherein the tap determination circuit is configured to differentiate between an audible signal generated by a physical tap on one end portion of the housing from a physical tap on an opposite end portion of the housing based on the microphone signals from the microphones.

13. The communication terminal of claim 11, wherein the tap determination circuit is configured to identify an approximate direction of arrival of an audible signal associated with a physical tap on the housing based on a phase difference between appearance of a contribution of the audible signal to the microphone signals from the microphones.

14. The communication terminal of claim 11, wherein the tap determination circuit is configured to generate a first indication of user input responsive to a first direction of arrival of an audible signal associated with a physical tap on a first portion of the housing and to generate a second indication of a different user input responsive to a second direction of arrival of an audible signal associated with a physical tap on a second portion of the housing.

15. The communication terminal of claim 11, wherein:

a first one of the microphones is adjacent to a first portion of the housing to have increased sensitivity to a physical tap on the first portion; and a second one of the microphones is adjacent to a second portion of the housing to have increased sensitivity to a physical tap on the second portion.

16. The communication terminal of claim 1, wherein the first sound cavity portion of the housing comprises a raised button that extends beyond an outer surface of the housing.

17. The communication terminal of claim 16, wherein the raised button comprises a flexible material that can be compressed by a physical tap thereon.

18. The communication terminal of claim 1, wherein:

the sound sensing device comprises at least one microphone that is configured to generate a microphone signal responsive to an incident audible signal; and the first sound cavity portion of the housing is configured to focus sound generated from a physical tap thereon toward the microphone.

19. The communication terminal of claim 1, wherein:

the housing comprises a second sound cavity portion that is configured to generate sound having a second primary sound when physically tapped; and the tap determination circuit is configured to identify a component of the sense signal that is attributed to sound from the second sound cavity having the second primary sound, and to generate an indication of a second type of different operator input based on identified component.

20. The communication terminal of claim 1, wherein:
the sound sensing device comprises a first microphone and a second microphone, wherein the microphones are each configured to generate a microphone signal responsive to an incident audible signal;
the first microphone is adjacent to a first portion of the housing;
the second microphone is adjacent to a second portion of the housing;
and the tap determination circuit is configured to identify and distinguish a physical tap on the first portion of the housing from a physical tap on the second portion of the housing based on the microphone signal from the corresponding microphone, and to generate an indication of a first type of operator input based on identifying a physical tap on the first portion of the housing, and to generate an indication of a second type of different operator input based on identifying a physical tap on the second portion of the housing.

21. The communication terminal of claim 20, wherein the first and second microphones are adjacent to opposite end portions of a same side of the housing.

* * * * *